(12) United States Patent
Dabke (10) Patent No.: US 8,606,618 B2
(45) Date of Patent: Dec. 10, 2013

(54) METHOD AND SYSTEM FOR WEB-BASED IDEA PREDICTION MARKET INVESTMENT

(75) Inventor: Padmanabh Dabke, Danville, CA (US)

(73) Assignee: Mindjet LLC, San Francisco, CA (US)

( * ) Notice: Subject to any disclaimer, the term of this patent is extended or adjusted under 35 U.S.C. 154(b) by 221 days.

(21) Appl. No.: 13/065,934

(22) Filed: Mar. 31, 2011

(65) Prior Publication Data

US 2012/0150585 A1 Jun. 14, 2012

Related U.S. Application Data

(60) Provisional application No. 61/459,565, filed on Dec. 14, 2010.

(51) Int. Cl.
*G06F 17/00* (2006.01)
(52) U.S. Cl.
USPC .......................................................... 705/7.29
(58) Field of Classification Search
USPC ....................................................... 705/7.29
See application file for complete search history.

(56) References Cited

U.S. PATENT DOCUMENTS

| | | | |
|---|---|---|---|
| 7,668,773 B1 * | 2/2010 | Pruitt | 705/36 T |
| 2002/0095305 A1 | 7/2002 | Gakidis et al. | 705/1 |
| 2005/0021441 A1 * | 1/2005 | Flake et al. | 705/37 |
| 2005/0108120 A1 * | 5/2005 | Malka et al. | 705/35 |
| 2009/0182624 A1 | 7/2009 | Koen et al. | 705/10 |
| 2009/0254386 A1 | 10/2009 | Wang et al. | 705/7 |

* cited by examiner

*Primary Examiner* — Thomas Dixon (57) ABSTRACT

A method for idea prediction market investment is provided. In an idea management system, a network server advertises to a user, via a network and a client device, a first idea that the user can invest an amount of virtual money X during an investment period in an idea prediction market. The advertising indicates to the user how much virtual money Y the user will receive if the user holds the investment until the first idea gets selected at the close of the investment period. The return of investment (ROI) Y over X is based at least on a second idea in the idea prediction market. In one embodiment, the user may divest the investment X prior to the close of the investment period. In another embodiment, the user is prevented from divest the investment X prior to the close of the investment period.

21 Claims, 5 Drawing Sheets

CLOSE THIS IDEA *TEST IDEA 2 FOR TRADING*

CLICK ON SUBMIT BUTTON WILL CLOSE IDEA SUCCESSFULLY
WAS THIS IDEA SUCCESSFULLY IMPLEMENTED?
- ⦿ YES (CLOSED)
- ◯ NO (ABORTED)

ADDITIONAL NOTES OR REASON FOR REQUESTING IDEA CLOSURE

SUCCESSFUL (SUBMIT)

FIG. 9

USER PROFILE

MY PROFILE

PREFERRED NAME:

EMAIL:

(INVITE)

USER STATS ▼

(EDIT PROFILE) (SIGN OUT)

(FILES) (MY BLOG)

JOIN DATE:

POSTS: 0

VIEWS: 15 TIMES

NET WORTH: 2,900 SPIGITS

FIG. 10

METHOD AND SYSTEM FOR WEB-BASED IDEA PREDICTION MARKET INVESTMENT

CROSS REFERENCE TO RELATED APPLICATIONS

This application claims priority under 35 U.S.C. §119 from U.S. Provisional Application No. 61/459,565, entitled "Method for Web-Based Idea Market Investment," filed on Dec. 14, 2010, the subject matter of which is incorporated herein by reference.

TECHNICAL FIELD

The present invention relates generally to idea collaboration system and method, and, more particularly, to idea prediction market investment.

BACKGROUND

In many organizations, an idea management system is used as a management tool for organizing, tracking, collaborating, evaluating, and implementing innovative ideas. An idea management system generally allows an organization to capture the best innovative idea for the purpose of producing positive results for the organization and its employees. For example, using an idea management system, an organization can collect various ideas from its employees, customers, suppliers, industry groups, to improve the quality of its product and/or service, to reduce overhead and expense, to enhance business performance and opportunities, and to provide a better working environment. An effective idea management system provides a platform for all users within the organization to express their innovative ideas, and enables the best idea to emerge from all the ideas.

An idea management system typically includes an idea collaboration market that allows the users to post their own ideas and to evaluate other users' ideas via various mechanisms such as posting comments, reviews, scores, and rankings. In addition to the idea collaboration market, an idea management system may also include an idea prediction market to further evaluate each idea. An idea prediction market is a type of prediction market that allows the users to predict which ideas will at some point in time be selected, implemented, and generate substantial benefit for their organization. In an idea prediction market, each idea is associated with a share price and is traded among participants in the idea prediction market. Participants buy shares when they predict the idea to be "good", or sell shares when they predict the idea to be "bad". Therefore, under the market mechanism, the value of an idea is supposed to be reflected in the share price of that idea. Ideally, by applying the market mechanism, the total sum of information that is present with all the participants is most effectively aggregated.

For detailed examples of idea prediction market, please see U.S. Patent Application Publication number 2009/0182624, entitled "Method and Apparatus for Generating and Evaluating Ideas in an Organization," filed on Dec. 15, 2008. Other examples of idea prediction market can be found at Spigit website, where various idea management systems are being developed by Spigit Inc., Pleasanton, Calif.

SUMMARY

A method for idea prediction market investment is provided. In an idea management system, a network server advertises to a user, via a network and a client device, a first idea that the user can invest an amount of virtual money X during an investment period in an idea prediction market. The advertising indicates to the user how much virtual money Y the user will receive if the user holds the investment until the first idea gets selected at the close of the investment period. The return of investment (ROI) Y over X is based at least on a second idea in the idea prediction market and is contingent upon the final selection of the first idea.

In one embodiment, the user may divest the investment X prior to the close of the investment period. The user, however, may not receive an amount of virtual money that is more than the user originally invested. In another embodiment, the user is prevented from divest the investment X prior to the close of the investment period. By prohibiting short-term trading and profiting from an investment of an idea, each investor is encouraged to focus on the underline value of the idea, but not on making short-term profit.

At the close of the investment period, the best idea is selected for implementation. In one embodiment, an independent selection mechanism is used. For example, a group of people with expertise or authority may make the final decision on which idea to be selected independently, although such decision may be partially based on the ranking or pricing of the idea. By using an independent idea selection mechanism, the idea selection process does not become a pure population contest.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
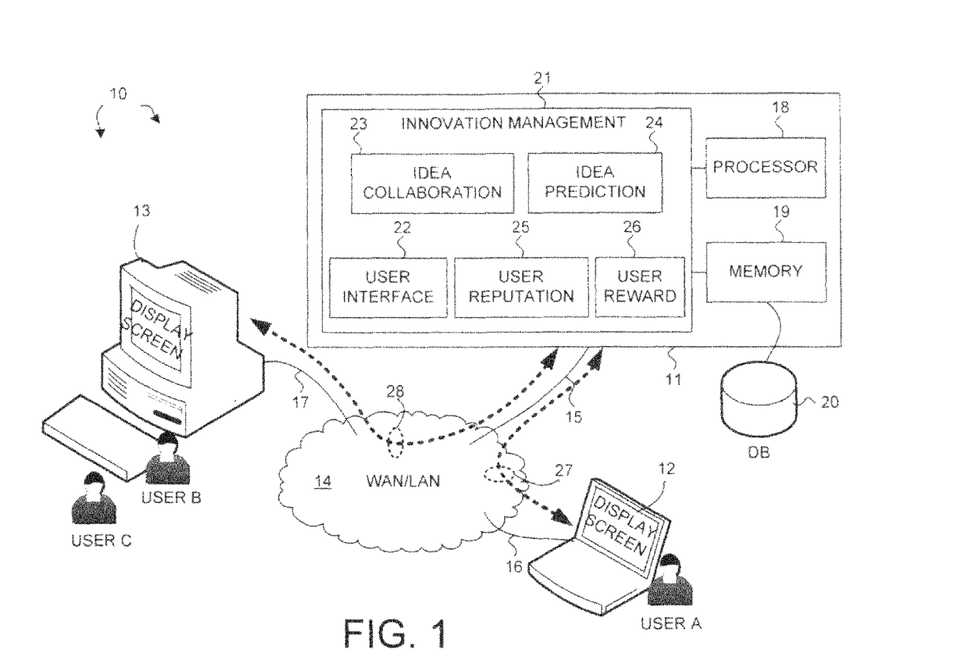
FIG. 1 illustrates one embodiment of an idea management system in accordance with one novel aspect.

FIG. 1 illustrates one embodiment of an idea management system 10 in accordance with one novel aspect. Idea management system 10 comprises a server computer 11, a first client computer 12, a second client computer 13, and a wide-area-network (WAN) or local-area-network (LAN) 14 that interconnects the server and client computers together via wired or wireless communication links 15-17. Idea management system 10 is used by an organization/company as a management tool for organizing, tracking, collaborating, evaluating, and implementing innovative ideas. For example, a company invites all its employees to come up with innovative ideas to solve a specific challenging problem. The employees, as registered users (e.g., users A, B, and C), utilize idea management system 10 to post their own ideas and to evaluate other users' ideas. After a period of collaboration and evaluation, the best idea is then selected by the company for implementation to solve the specific challenging problem.

In the example of FIG. 1, server computer 11 comprises a processor 18, memory 19 that connects to a permanent database DB20, and an innovation management module 21. Innovation management module 21 comprises a user interface 22, an idea collaboration module 23, an idea prediction module 24, a user reputation module 25, and a user reward module 26. User interface 22 allows register users to input their own ideas and to evaluate other users' ideas by posting comments, reviews, votes, and rankings through a user terminal screen (e.g., the display screens of user computers 12-13). Idea collaboration module 23 creates an idea collaboration market that keeps track of the status of each idea and manages the entire evaluation process such as capturing, collaborating, commenting, voting, ranking, and graduating of each idea. Idea prediction module 24 creates an idea prediction market that provides the registered users (e.g., investors) a mechanism to invest on the best idea that they predict will be selected by the company for implementation. User reputation module 25 manages the profile, activity and determines the reputation of all registered users in the idea collaboration and idea prediction market. User reward module 26 manages the incentives for all registered users based on their activity and performance.

The different modules within innovation management module 21 are function modules that interwork with each other. The function modules, when executed by processor 18, allow idea management system 10 to effectively and efficiently manage innovative ideas via communication between the server computer and the client computers. Various user activities are performed by exchanging communication messages (e.g., 27 and 28) in idea management system 10. In a first example, user A comes up with a new idea and is able to post the new idea from the display screen of client computer 12. In a second example, user B wants to rank an existing idea. User B is able to browse all the comments associated with the idea from the display screen of client computer 13 and then rank the idea accordingly. In a third example, user C is able to make investment in an idea prediction market from client computer 13. All the user activities performed by the registered users and all the information created and updated related to all the innovative ideas are saved by server computer 11 onto DB20.

In one novel aspect, idea prediction module 26 creates a simple and effective idea prediction market for a group of ideas that solves a specific problem. During a pre-defined investment period, investors make investment on ideas they predict that are most suitable, beneficial, and are most likely to be selected by the company for implementation to solve the specific problem. In addition to provide an engaging experience for investors similar to the stock market, the novel idea prediction market eliminates complicated pricing and short-term trading behavior such that the investors will focus in evaluating the true value of each idea and make investment based on their own evaluation.

Figure 2:
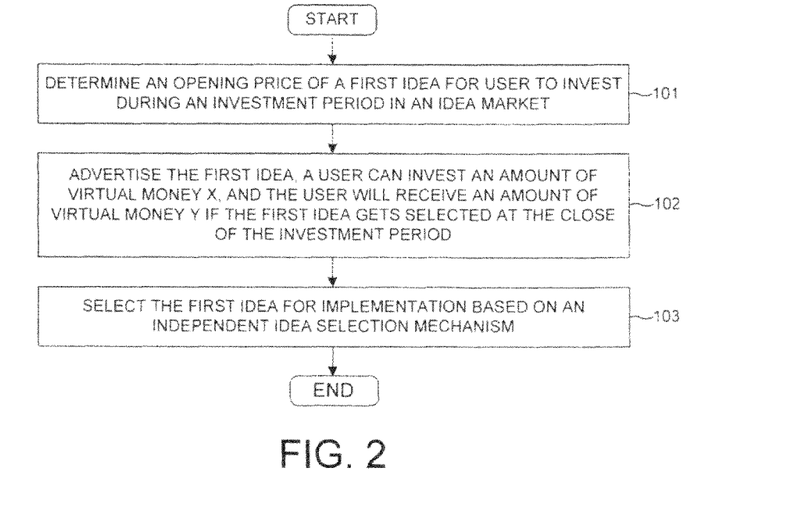
FIG. 2 is a flow chart of a method of idea market investment in accordance with one novel aspect.

FIG. 2 is a flow chart of a method of idea market investment in accordance with one novel aspect. In step 101, an idea prediction market is created for a plurality of ideas for a pre-defined investment period. Typically, the plurality of ideas is associated with a particular problem to be solved by an organization/company. At the opening day of the prediction market, each idea has a pre-defined opening price. In step 102, based on the opening price of each idea, a user/investor is advertised, e.g., from a display screen of the user's client computer, about the investment opportunity and performance of each idea. For example, the investor will be informed the return of investment (ROI) associated with each idea when the idea is selected as the winner at the closing of the investment period. In step 103, at the close of the investment period, the best idea will be selected by the company for implementation. The investors who invest on the winning ideas will make profit from their investment, while the investors who invest on the losing ideas will lose their investment. A complete example of idea management with user interface is now described below with more details with accompanying drawings.

Figure 3:
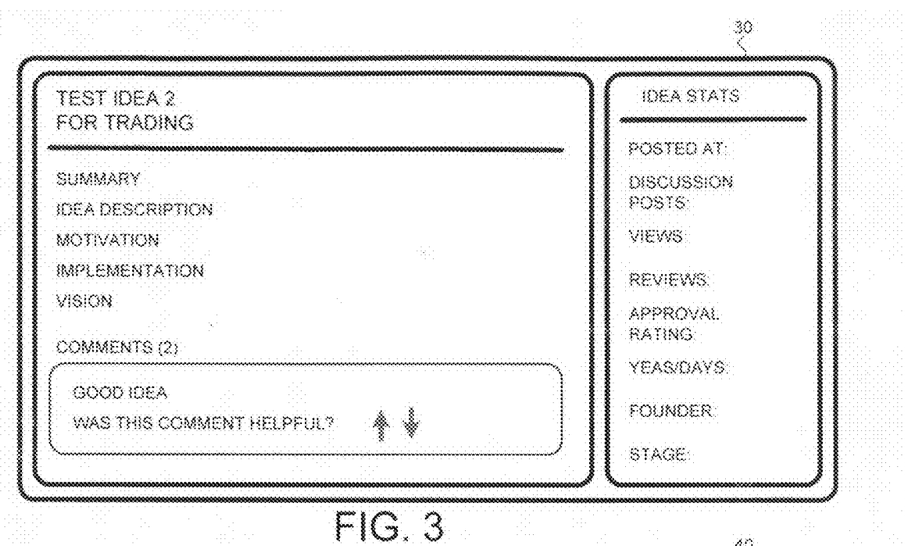
FIG. 3 is a simplified user interface screen that presents general information about an idea to a user.

FIG. 3 is a simplified user interface screen 30 that presents general information about an idea to a user. User interface screen 30 displays general information and stats information of an idea named as "Test Idea 2 for Trading". The general information displayed includes name, summary, description, motivation, implementation, and vision about this particular idea. Screen 30 also displays comments posted by users for this particular idea, and whether users think such comments are helpful. Statistics information displayed includes posting time, number of discussion posts, views, reviews, approval rating, age, founder, and stage of this particular idea. All those information helps the user to have a quick overview about the idea and helps the user to provide additional evaluation for the idea.

Figure 4:
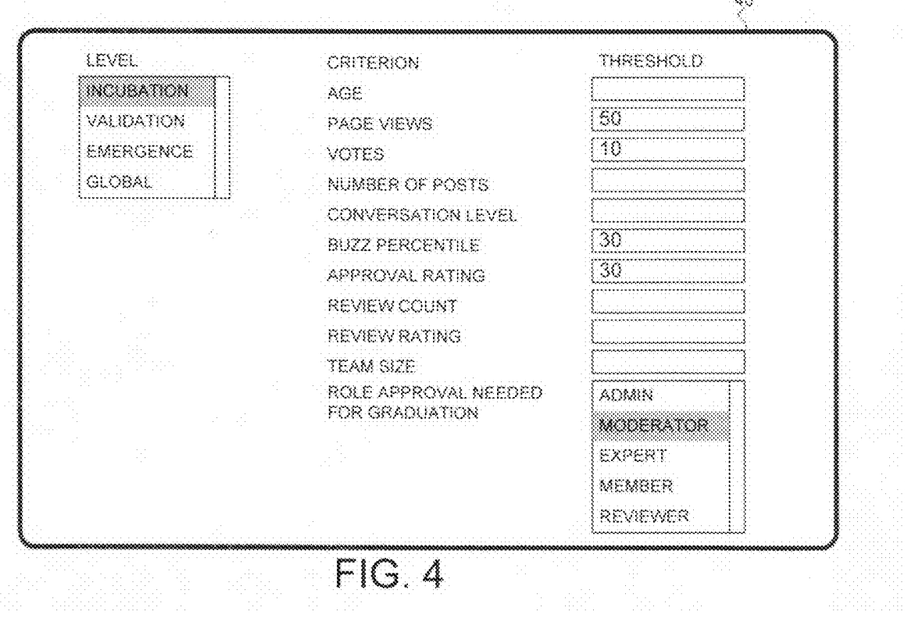
FIG. 4 is a simplified user interface screen that presents different stages of an idea and configurable threshold settings for the idea to graduate from one stage to another stage.

FIG. 4 is a simplified user interface screen 40 that presents different stages of an idea and configurable threshold settings for the idea to graduate from one stage to another stage. To help organizing and tracking the popularity and progress of each idea, ideas are categorized into different stages (e.g., merit levels). In the example of FIG. 4, each idea can go through four stages during its lifetime including incubation (where a new idea gets created by a user), validation (where the idea receives reviews from certain experts), emergence (where certain members in the community support the idea and the idea is typically open for IPO in the idea prediction market), and global (where the best idea is eventually selected for implementation by the organization).

In order to graduate from one stage to the next stage, a set of criterion must be met with a set of pre-defined thresholds. The set of criterion includes idea age, qualified page views, votes, number of posts, conversation level, buzz percentile, approval rating, review count, review rating, team size, and role approval needed for graduation. The set of thresholds is configurable for different graduation. In general, the requirement is low for an idea to graduate from incubation to validation, and becomes higher for an idea to graduate from validation to emergence, and the highest for an idea to graduate from emergence to global. As illustrated in FIG. 4, to graduate from incubation to validation, an idea may only need 50 page views, 10 votes, 30 buzz percentile, 30 approval rating, and a moderator to approve the graduation. On the other hand, to graduate from validation to emergence and to global, an idea must meet much higher requirements such as reviews from certain experts in the field, and support from certain members in the community. By categorizing each idea into different stages, a large amount of ideas created by the users are mechanically and automatically filtered out stage by stage based on its popularity and potential value, and finally the best ideas are emerged.

Figure 5:
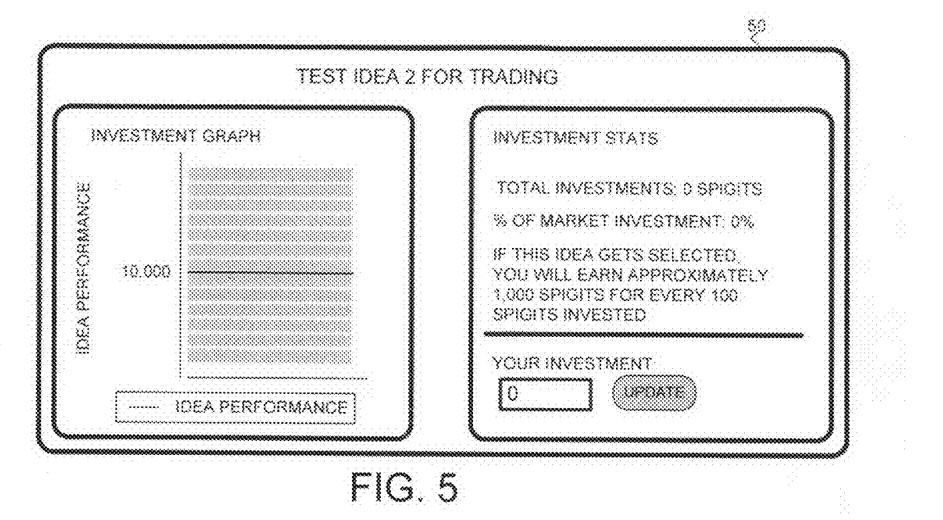
FIG. 5 is a simplified user interface screen that presents investment information about an idea to a user before trading.

FIG. 5 is a simplified user interface screen 50 that presents investment information about an idea to a user before trading. In the example of FIG. 5, the user is interested in investing on the idea named as "Test Idea 2 for trading" that has been listed for IPO. The left part of user interface screen 50 shows an investment graph of the idea performance. The graph shows that this idea is currently having an IPO price of 10.00 virtual currency (e.g., in the unit of Spigit money) per idea market share (e.g., in the unit of Spock share). The right part of user interface screen 50 shows the investment stats of the idea performance. The stats show that, currently, this idea has not been invested by this investor and its market share percentage is zero. In addition, the display screen also advertises that if this idea gets selected at the end of the investment period, then the investor will earn approximately 1,000 Spigits for every 100 Spigits invested. The user is then provided by a field to enter the amount of Spigits he/she wish to invest.

Different IPO policies determine when an idea is eligible for IPO and what the initial IPO price of the idea is. In one example, a group of ideas may be eligible for trading in the idea prediction market during a pre-defined investment period. Alternatively, an idea may be eligible for trading when the idea is graduated to the emergence merit level. In another example, the IPO price of an idea is associated with its ranking (e.g., a range between 0-100 Spigits Score) determined by the idea collaboration market. Alternatively, the IPO price of an idea may be a fixed price (e.g., 50 Spigits per share) and may be the same for every idea in the idea prediction market.

Figure 6:
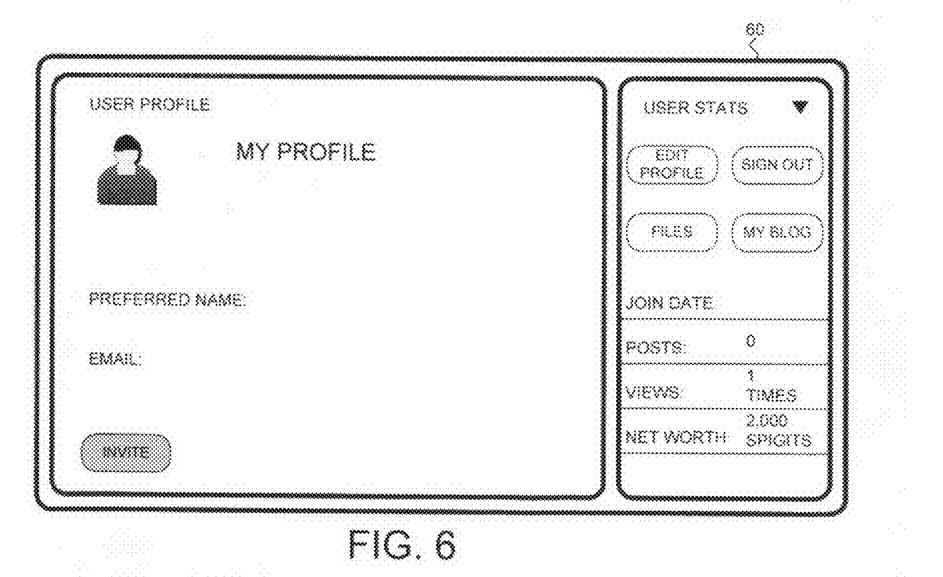
FIG. 6 is a simplified user interface screen that presents a user profile before the user making any investment and trading in the idea prediction market.

FIG. 6 is a simplified user interface screen 60 that presents'a user profile before the user making any investment and trading in the idea prediction market. Because the user has not made any investment or trading on any idea yet, the user profile does not include any innovation portfolio on the left side of user interface screen 60. On the right side of user interface screen 60, some user stats are displayed including the join date, number of posts, number of views, and the net worth of the user (e.g., 2,000 Spigits). The user then is able to determine how much virtual money he/she wish to invest on a particular idea.

Figure 7:
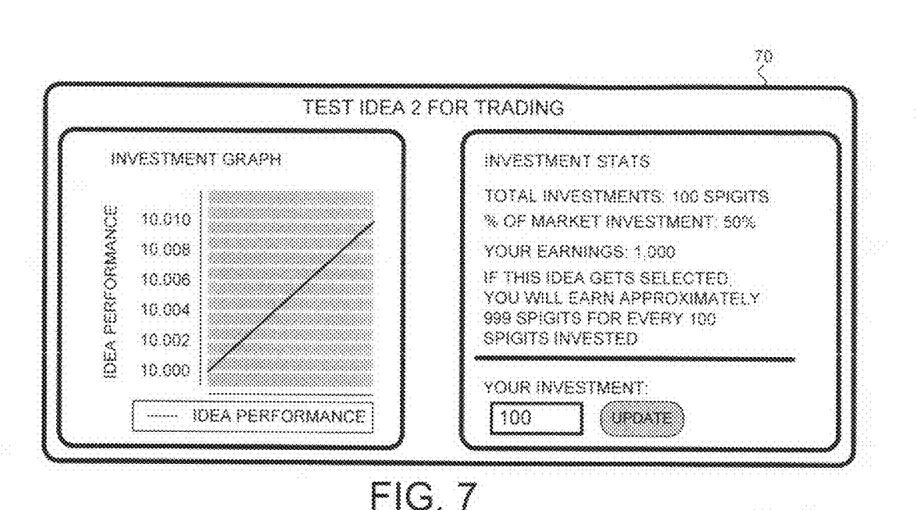
FIG. 7 is a simplified user interface screen that presents an idea to a user after trading.

FIG. 7 is a simplified user interface screen 70 that presents an idea to a user after trading. In the example of FIG. 7, the user decides to spend 100 Spigits to invest on the idea named as "Test Idea 2 for trading". The left part of user interface screen 70 shows the investment graph of the idea performance. The graph shows that the price of the idea slightly increases from 10.00 Spigits per share to 10.01 Spigits per share after the user invests 100 Spigits on the idea. On the right part of user interface screen 70, investment stats show that the total investments on this idea is 100 Spigits, the market share percentage is 50%, and the potential earning from this investment is 1000 Spigits. In addition, because the price of the idea has slightly increased, any future investor will make approximately 999 Spigits for every 100 Spigits invested.

Figure 8:
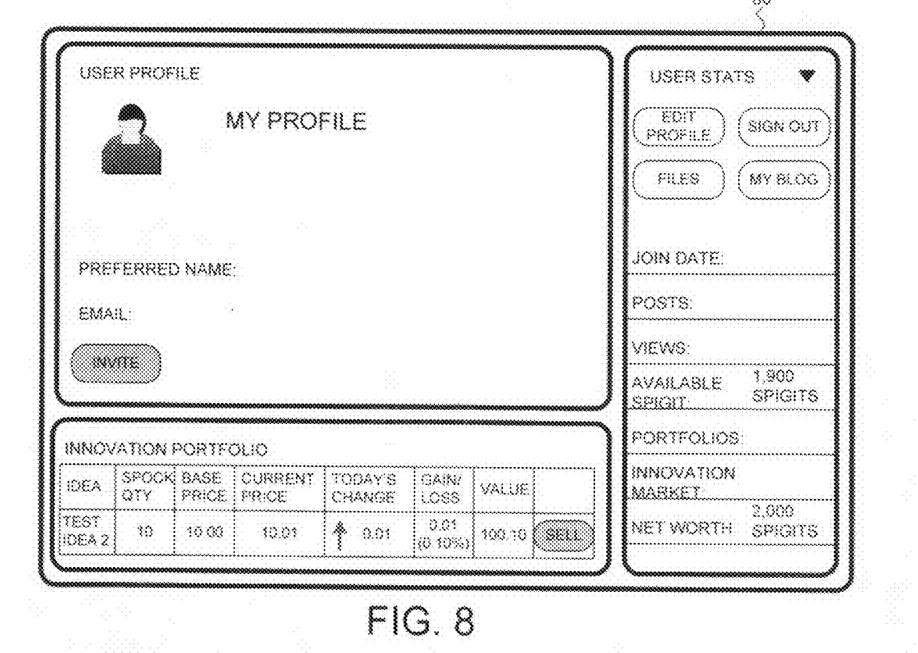
FIG. 8 is a simplified user interface screen that presents a user profile after the user making an investment and trading in the idea prediction market.

FIG. 8 is a simplified user interface screen 80 that presents a user profile after the user making an investment and trading in the idea prediction market. On user interface screen 80, the innovation portfolio box lists that the idea named as "Test Idea 2" has been purchased with 10 SPOCK quantity with 10.00 Spigits per share base price and 10.01 Spigits per share current price. In the user stats block, it is listed that the user has 1,900 remaining Spigits available for investment and the net worth is still 2,000 Spigits. While the user may make profit out of the investment, such ROI is contingent upon whether the invested idea is selected by the company at the close of the investment period.

A traditional idea prediction market is very similar to a stock market, where an investor may buy or sell shares of a stock/idea any time, and where the price per share of the stock/idea is updated after each trading. The price or market capital for each idea is dynamical calculated based on each trade made by each investor. In one example, the price of an idea P can be determined based on the following equation, assuming unlimited amount of shares available in the market:

$$P=e^{q1/k}/e^{q1/k}+e^{q2/k}$$

where q1 denotes the amount of shares for this idea and q2 denotes the amount of shares of all Other ideas in the entire idea prediction market.

Although the traditional idea prediction market may provide an engaging experience for the investors, it may also be too overwhelming for investors to fully understand the market because of the complicated pricing and the dynamic trading behavior. First, because the share price of each idea is dynamically updated, the more shares an investor is going to buy for an idea, the higher the price per share the investor will pay for the idea. For example, if the investor buys 100 shares for idea #A, it may cost him/her 10 Spigits per share. But if the investor buys 1,000 shares for the same idea #A, it may cost him/her 10.5 Spigits per share. This phenomenon may cause confusion to unsophisticated investors.

Second, because ideas in the traditional market are highly liquidatable, sophisticated investors may tend to engage in short-term activities such as day trading to make quick profit. For example, investors may focus on buying low and selling high for his/her investment, instead of focusing on making their own judgment on how good each idea is and how likely it is going to be selected by the company and implemented to solve a specific problem or to generate benefit for the company. As a result, the idea price in the idea prediction market can no longer accurately predict the true value of the idea.

In one novel aspect, the user interface screen in the idea prediction market only advertises the ROI of each idea, without exposing the number of shares that an investor will invest. Although there is a correlation between the share price and the ROI of each idea, such information is not exposed to the user. Referring back to FIG. 5, while the price associated with idea "Test Idea 2 for trading" is listed in the investment graph, the investor is only advertised with its ROI without listing the number of shares to be invested. In other words, the investment stats simply advertises to the investor that "you will receive approximately 1,000 Spigits for every 100 Spigits invested" without presenting complicated price per share information.

Furthermore, the novel idea prediction market prevents the investors from engaging in short-term trading behavior. This is achieved by eliminating any gain or loss during the investment period. That is, before an idea gets selected or discarded at the close of the investment period, an investor does not realize any gain or loss by changing the investment on the idea. In one embodiment, the investor has to hold the investment till the end of the investment period, when the best idea is either selected or discarded. In another example, the investor may divest the investment and get the same amount of invested virtual money back. The investor, however, may not profit from such trading even though the price of the idea has already gone up. By prohibiting short-term trading and profiting from an investment of an idea, each investor is encouraged to focus on the underline value of the idea, but not on making short-term profit.

Figure 9:
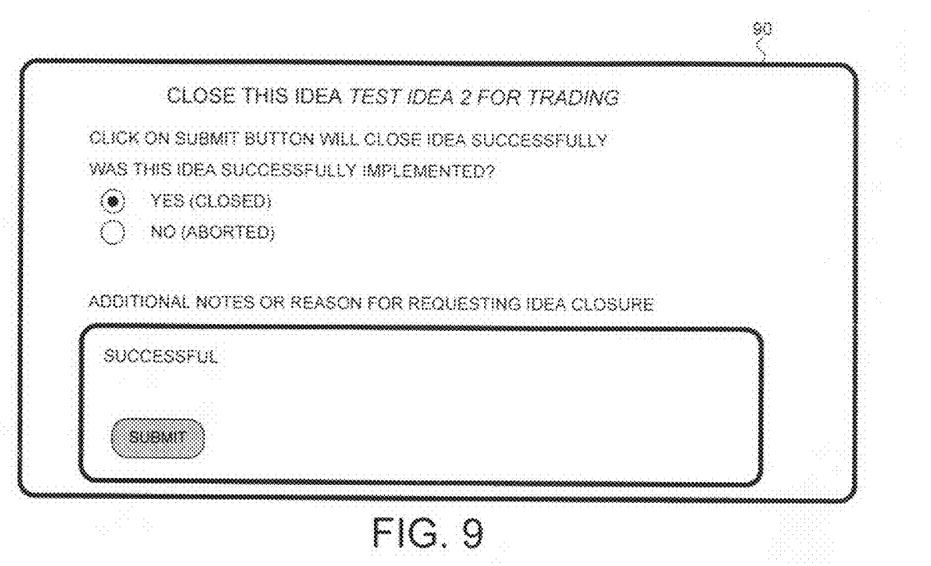
FIG. 9 is a simplified user interface screen that presents the closing stage of an investment period.

FIG. 9 is a simplified user interface screen 90 that presents the closing stage of an investment period. During the closing stage, each idea will either be closed (i.e., selected and successfully implemented) or aborted (i.e., discarded). Typically, only one idea will be closed and all the remaining ideas are aborted. To ensure that the best and most valuable idea gets closed, various idea selection mechanisms may be used. In one embodiment, the idea with the highest ranking determined in the idea collaboration market may be selected. In another embodiment, the idea with the highest price determined in the idea prediction market may be selected. In yet another embodiment, an independent selection mechanism may be utilized. For example, a group of people with expertise or authority may make their final decision on which idea to be selected independently, although such decision may be partially based on the ranking or price of the idea. By using an independent idea selection mechanism, it is further prevented to make the idea selection process a pure population contest.

Figure 10:
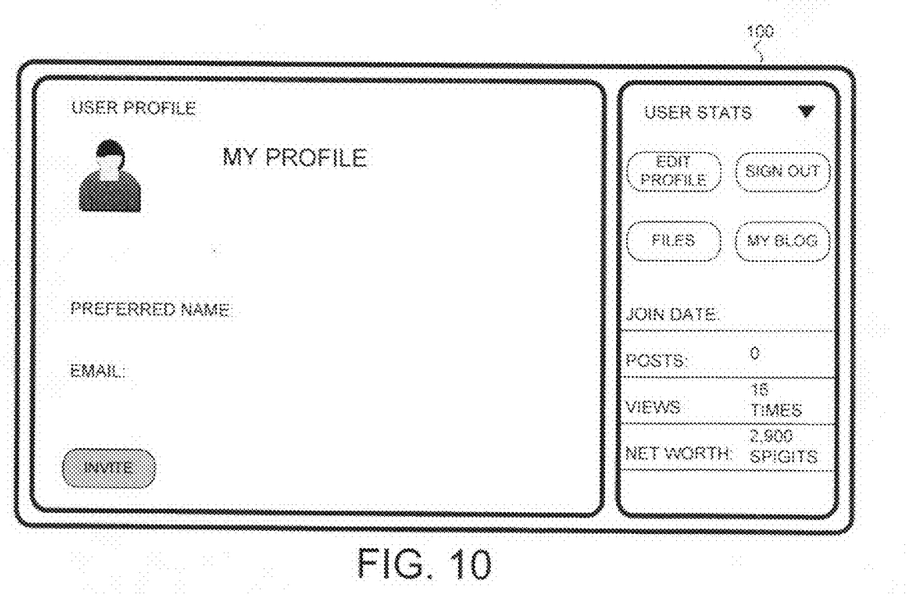
FIG. 10 is a simplified user interface screen that presents a user profile after an invested idea is being successfully selected and implemented.

FIG. 10 is a simplified user interface screen 100 that presents a user profile after an invested idea is being successfully selected and implemented. After an invested idea gets successfully closed, the investor who has invested on the idea will be rewarded by the amount he/she was promised to receive at the time the investment was made. In the example of FIG. 10, because the idea "Test Idea 2 for Trading" was successfully selected, the initial 100 Spigits investment becomes 1,000 Spigits, and thus the net worth of the investor grows from the initial 2,000 Spigits to 2,900 Spigits. It should be noted that, because the price of each idea is dynamically updated, an idea is relatively cheap during the early stage of the investment period when the idea is not yet popular and has not been heavily invested. Therefore, the only way to make more money is to bet on the right idea as early as possible and hold the investment until the end of the investment period, and investors are thus encouraged to look for ideas that have great potential to be selected when the price of the idea is still cheap.

In one or more exemplary embodiments, the functions described above may be implemented in hardware, software, firmware, or any combination thereof. If implemented in software, the functions may be stored on or transmitted over as one or more instructions or code on a computer-readable (processor-readable) medium. Computer-readable media include both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that both can be used to carry or store desired program code in the form of instructions or data structures, and can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blue-ray disc where disks usually reproduce data magnetically, while discs reproduce data optically with lasers. Combinations of the above should also be included within the scope of computer-readable media.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A computer-implemented method, comprising:
   presenting, via a network and a client device, a plurality of innovative ideas for investment in an idea prediction market, wherein each innovative idea has an initial value in the idea prediction market;
   advertising to a user, via the network and the client device, a first idea that the user can invest an amount of virtual money X during an investment period in the idea prediction market, wherein the advertising indicates to the user how much virtual money Y the user will receive if the user holds the investment until the first idea gets selected at the close of the investment period, wherein Y over X is based at least on an amount of investment of a second idea in the idea prediction market, and wherein the user cannot receive more than X virtual money prior to the close; and
   selecting the first idea for implementation at the close of the investment period, wherein a final payout of virtual money Y over X is contingent upon the selection of the first idea.

2. The method of claim 1, further comprising:
   providing the user an opportunity to divest the investment X prior to the close of the investment period.

3. The method of claim 1, wherein the user is prevented from divesting the investment X prior to the close of the investment period.

4. The method of claim 1, wherein Y over X is based at least on the total amount of investment for the first idea and a total amount of investment for all ideas in the idea prediction market.

5. The method of claim 1, wherein the first idea is associated with a value in the idea prediction market, and wherein the first idea is selected based on a selection mechanism independent from the value.

6. The method of claim 5, wherein the first idea is ranked in an idea collaboration market, and wherein the initial value of the first idea in the idea prediction market is determined based on the ranking.

7. The method of claim 5, wherein the first idea is ranked in an idea collaboration market, and wherein the initial value of the first idea in the idea prediction market is determined based on a predefined value.

8. A network server computer, comprising:
   a processor;
   a database;
   a user interface that presents a plurality of innovative ideas for investment in an idea prediction market, wherein each innovative idea has an initial value in the idea prediction market; and
   an idea prediction module that advertises to a user, via the user interface, a first idea that the user can invest an amount of virtual money X during an investment period in the idea prediction market, wherein the advertising indicates to the user how much virtual money Y the user will receive if the user holds the investment until the first idea gets selected at the close of the investment period, wherein Y over X is based at least on an amount of investment of a second idea in the idea prediction market, wherein the user cannot receive more than X virtual money prior to the close, wherein the first idea is selected for implementation at the close of the investment period, and wherein a final payout of virtual money Y over X is contingent upon the selection of the first idea.

9. The network server computer of claim 8, wherein the idea prediction module provides the user an opportunity to divest the investment X prior to the close of the investment period.

10. The network server computer of claim 8, wherein the user is prevented from divesting the investment X prior to the close of the investment period.

11. The network server computer of claim 8, wherein Y over X is based at least on the total amount of investment for the first idea and a total amount of investment for all ideas in the idea prediction market.

12. The network server computer 8, wherein the first idea is associated with a value in the idea prediction market, and wherein the first idea is selected based on a selection mechanism independent from the value.

13. The network server computer of claim 12, further comprising:
an idea collaboration module that ranks the first idea, and wherein the initial value of the first idea in the idea prediction market is determined based on the ranking.

14. The network server computer of claim 12, further comprising:
an idea collaboration module that ranks the first idea, and wherein the initial value of the first idea in the idea prediction market is determined based on a predefined value.

15. A non-transitory computer-readable medium storing instructions that, when executed by a processor, cause the processor to perform a method, the method comprising:
presenting, via a network and a client device, a plurality of innovative ideas for investment in an idea prediction market, wherein each innovative idea has an initial value in the idea prediction market;
advertising to a user, via the network and the client device, a first idea that the user can invest an amount of virtual money X during an investment period in the idea prediction market, wherein the advertising indicates to the user how much virtual money Y the user will receive if the user holds the investment until the first idea gets selected at the close of the investment period, wherein Y over X is based at least on an amount of investment of a second idea in the idea prediction market, and wherein the user cannot receive more than X virtual money prior to the close; and
selecting the first idea for implementation at the close of the investment period, wherein a final payout of virtual money Y over X is contingent upon the selection of the first idea.

16. The computer-readable medium of claim 15, the method further comprising:
providing the user an opportunity to divest the investment X prior to the close of the investment period.

17. The computer-readable medium of claim 15, wherein the user is prevented from divesting the investment X prior to the close of the investment period.

18. The computer-readable medium of claim 15, wherein Y over X is based at least on the total amount of investment for the first idea and a total amount of investment for all ideas in the idea prediction market.

19. The computer-readable medium of claim 15, wherein the first idea is associated with a value in the idea prediction market, and wherein the first idea is selected based on a selection mechanism independent from the value.

20. The computer-readable medium of claim 19, wherein the first idea is ranked in an idea collaboration market, and wherein the initial value of the first idea in the idea prediction market is determined based on the ranking.

21. The computer-readable medium of claim 19, wherein the first idea is ranked in an idea collaboration market, and wherein the initial value of the first idea in the idea prediction market is determined based on a predefined value.

* * * * *